Jan. 3, 1928.

H. G. GEISSINGER

ELECTROMAGNETIC FUEL CONTROL VALVE

Filed Oct. 27, 1924

1,654,642

Inventor
H. G. Geissinger
By Eugene C. Brown
Attorney

Patented Jan. 3, 1928.

1,654,642

UNITED STATES PATENT OFFICE.

HARRY G. GEISSINGER, OF DETROIT, MICHIGAN.

ELECTROMAGNETIC FUEL-CONTROL VALVE.

Application filed October 27, 1924. Serial No. 746,170.

This invention relates to an electrically controlled valve and especially to a valve structure particularly adapted to control the flow of fuel oil or gas to a burner.

More specifically the invention relates to an improvement of such valve structures for controlling the flow of fuel oil or gas as, for example, is shown in my prior application for patent filed by me on December 24th, 1920, and bearing the Serial Number 433,004.

The principal objects of the present invention are to provide an improved valve structure wherein the several parts are of such form and construction as to lend themselves to economical production, to so arrange such parts that they may be readily assembled; to provide a novel cut-off valve arrangement, and to provide an improved means for supporting certain springs needful in such a valve, as well as other objects which will be hereinafter specifically set forth and particularly pointed out in the appended claims, reference being had to the accompanying drawings wherein, Figure 1 is a longitudinal, median section through a valve constructed in accordance with this invention.

Figure 1:
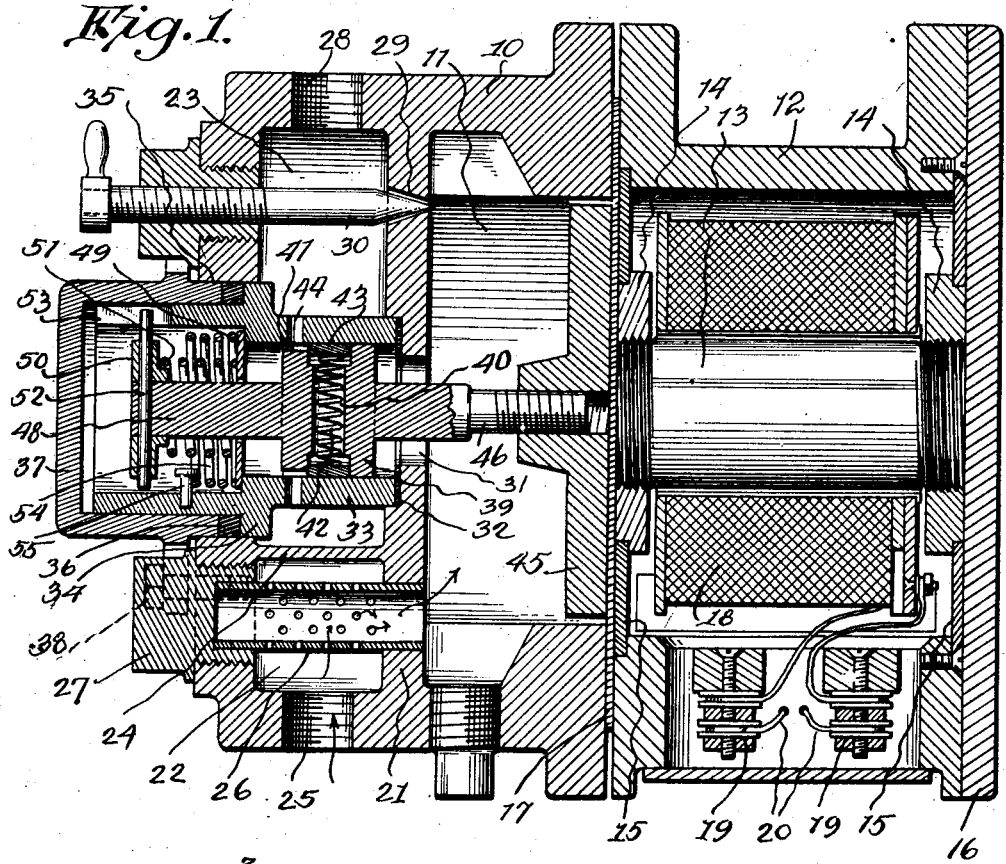

It is important that, in certain conditions of operation, leakage of fuel oil or gas shall be eliminated and while this may be done in piston valves of the usual construction by strictly holding the fits within narrow tolerances such a method necessarily requires very exact machining and consequently is highly expensive. The present invention provides an improved piston valve construction wherein a tight fit and no leakage is ensured without expensive machine operations and the requirement of close limitations. Also the present construction is one wherein the several parts may be made by ordinary operations such are performed on screw machines or other types of automatic lathes and the like while, at the same time, the parts are so shaped as to enable the entire device to be quickly assembled without the necessity of grinding parts together, making scraped fits or other expensive operations, no part requiring to be fitted to another within fine limits.

In the present construction it will be seen, by reference to the drawings, that there is provided a casing 10 wherein is an oil chamber 11, the casing being suitably secured to the magnetic shell 12 constituting the yoke members of the actuating electro-magnet. This magnet has a core 13 provided with enlarged pole members 14 centrally held within the shell by means of non-magnetic members 15, one end of the shell being provided with a closure 16 of iron or the like with which one end of the core is in contact. Between the casing 10 and shell 12 is provided a non-magnetic plate 17 designed to prevent sticking of the armature to the remaining end of the core upon energization of the magnet. The magnet is provided with the usual winding 18 connected through suitable controlling device not necessary here to be shown but which may, if desired, be in the form of a thermostatic circuit closer, a manual switch or any other means as required by the specific use to which the valve is to be put.

The casing 10 is divided by a transverse diaphragm 21 into two main parts, one of these forming the chamber 11 while the other is again divided into an inlet chamber 22 and an outlet chamber 23 by a diaphragm 24. A suitable threaded opening 25 is provided in the lower part of the chamber 22 for the connection of a supply pipe and this chamber is connected with the chamber 11 by an opening in the wall or diaphragm 21 wherein is fitted one end of a perforated strainer tube 26, the other end being supported by a plug 27 screwed into the end wall of the chamber 22 and affording means for removing the tube for cleaning or repairs.

A threaded opening 28 is provided in the upper part of the chamber 23 for connection of a pipe leading to a suitable burner (not shown) and in the diaphragm 21 is formed an opening 29 constituting the seat for a manually controlled needle valve 30 by means of which a slow flow of the fluid used for fuel may be permitted between the chambers 11 and 23. Also, in the diaphragm there is a central opening 31 provided, on the side adjacent the chamber 23 with a recess to receive a packing washer 32 on which rests the inner end of a tubular valve casing or body member 33, the outer end of which is bored to a larger diameter than the inner end to provide a shoulder for certain purposes presently to be explained. Furthermore this valve body is provided externally between its ends with a flange 34 which is received in a suitable opening 35 formed centrally of the end wall of the casing 10. It will be noted that this flange is larger than the outer end of the valve body so that a packing 36 may be fitted in the space between said outer end and the wall of the opening 35 and be compressed against the flange by the inner end of a valve bonnet 37 closing the outer end of the valve body and secured to the casing 10 by bolts 38. It will be noted that the bolts not only hold the bonnet in place but also force the valve body firmly onto its seat.

Slidable in the inner end of the valve body 33 is a piston valve 39 having a diametrically disposed opening 40 provided with enlarged ends which communicate with outwardly extending recesses 41. Within the opening 40 is a helical spring 42 which bears at its ends against the shoes 43 which are held in the enlarged ends of the opening and serve to cover or uncover the ports 44 formed in the valve body in accordance with the outward or inward movement of the valve, these positions being shown in Figures 1 and 2 respectively. It will be now be noted that the piston valve itself may fit in the valve body with much less accuracy than is commonly required since the shoes will effect closure of the ports. Also, these shoes automatically are kept against the wall of the valve body so that wear of the parts does not affect the tightness of the fit and consequently leakage is prevented.

Figure 3:
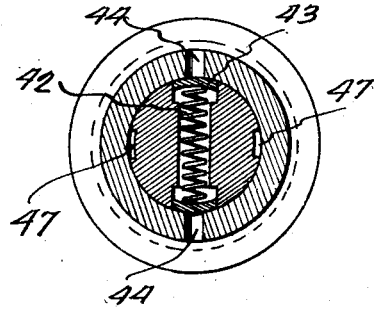
Figure 3 is a detail section on the line 3—3 of Figure 2.

It will be noted that the valve 39 moves between the inner end of the valve body and the ports 44 so that in its open position the valve is drawn inward by the action of the magnet on an armature 45 carried on the inner end of a stem 46 fixed to said valve. Consequently the fluid must flow past the valve from the chamber 11 to reach the ports 44 and accordingly lateral passages 47 (best seen in Figure 3) are provided for this purpose.

In order to move the valve outwardly and close the ports 44 whenever the magnet is de-energized, a forwardly extending stem 48 is provided which passes through a centrally disposed opening in a disk 49 resting on the shoulder between the inner and outer bores of the valve casing or body 34. On the outer or forward end of this stem is pinned or otherwise secured a suitable projection such as a head 50 between which and the disk 49 is arranged a spring 51 urging the valve outwardly.

The pin 52 which holds this head in position has one end extended to move in a slot 53 formed in the valve body and thereby serves to prevent rotation of the valve and displacement of the shoes out of proper position. A second spring 54 rests on the disk 49 at its inner end and bears against the pin 55 at its outer end. This spring yieldably holds the disc 49 against the shoulder in the valve casing 34.

Figure 2:
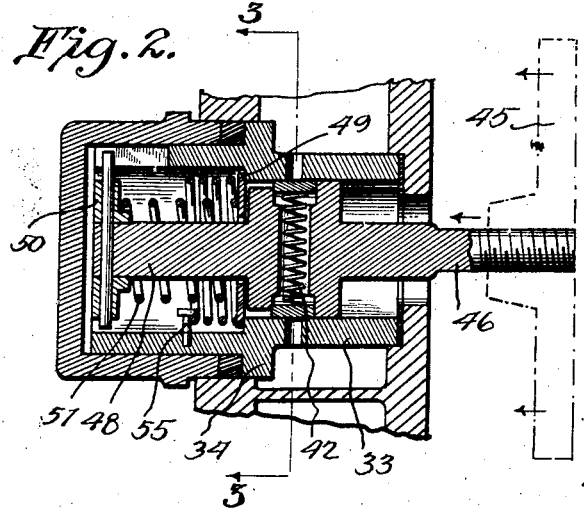
Figure 2 is a similar view of a portion of such valve showing certain of the parts in a different position.

In Fig. 2, showing the valve in a closed position, the piston 39 is shown in contact with the disc 49, being held thereto by the spring 51.

The impact of the valve and attached parts, in closing, is therefore checked by the elasticity of the spring 54, and any over motion of the parts is restored to the correct closed position by return of the disc 49 to its seat in the valve casing.

With this construction it will be plain that energization of the magnet opens the valve and de-energization thereof permits the valve to close.

Having thus described the invention, what is claimed as new, is:

1. A fluid controlling valve structure, including a casing having ports for passage of the fluid, a piston reciprocable to cover and uncover said ports, shoes carried by the piston to move therewith to close and open said ports, a stem projecting from one end of said piston and having a head thereon, a disk supported in said casing through which said stem passes, a spring interposed between the disk and head, and means to move the piston against the action of said spring.

2. A fluid controlling valve structure, including a casing having ports for passage of the fluid, a piston reciprocable to cover and uncover said ports, shoes carried by the piston to move therewith and close and open said ports, spring means constantly pressing said shoes outwardly, a stem projecting from one end of said piston and having a head thereon, a disk supported in said casing through which said stem passes, a spring interposed between the disk and head, and means to move the piston against the action of said spring.

3. A fluid controlling valve structure, including a casing having ports for passage of the fluid, a piston reciprocable to cover and uncover said ports, said piston having a diametrically disposed opening extending therethrough, shoes carried in the ends of said opening to bear against the inner side of said casing and close and open said ports, a spring in said opening interposed between said shoes and forcing the shoes against the inner surface of the casing, a stem projecting from one end of said piston and having a head thereon, a disk supported in said casing through which said stem passes, a spring interposed between the disk and head, and means to move the piston against the action of said spring.

4. In a valve structure a main casing having an end wall and a transverse diaphragm spaced therefrom, said wall and diaphragm having alined openings, a valve casing of tubular form extending through the opening in the end wall, a flange on said valve casing substantially fitting the last mentioned opening, a packing between the inner end of the valve casing and said diaphragm, a valve bonnet fitting over the outer end of the valve casing and entering the last mentioned opening, a second packing between the inner end of the bonnet and the said flange within said last mentioned opening, a valve in said valve casing and means to hold said bonnet on the main casing and thereby secure the valve casing in place.

5. A fluid controlling valve structure, comprising a casing having ports for the passage of a fluid, a piston reciprocable within said casing to cover and uncover said ports, a stem projecting from one end of said piston having a projecting member at its outer end, a disk bearing on one face against an abutment or shoulder in the casing wall, said disk having a central opening for the passage of said stem, a spring interposed between the disc and said projecting member, means to move the piston in one direction against the action of said spring, and a cushioning spring yieldingly holding said disk against said abutment to absorb the impact of said piston when moving in the apposite direction.

In testimony whereof I affix my signature.

HARRY G. GEISSINGER.